US011029821B2

(12) United States Patent
Ryan et al.

(10) Patent No.: US 11,029,821 B2
(45) Date of Patent: *Jun. 8, 2021

(54) SYSTEMS AND INTERACTIVE USER INTERFACES FOR AUTOMATIC GENERATION OF TEMPORAL REPRESENTATION OF DATA OBJECTS

(71) Applicant: PALANTIR TECHNOLOGIES INC., Palo Alto, CA (US)

(72) Inventors: Paul Ryan, New York City, NY (US); Sharon Hao, San Jose, CA (US); Bradley Engel, Gaithersburg, MD (US); Xinyi Wang, Ithaca, NY (US); Jack Grossman, Palo Alto, CA (US); Gregory Martin, Royal Oak, MI (US); Andrew Elder, Cherry Hills Village, CO (US); Ryan Xie, Fremont, CA (US); Brian Hamilton, Arlington, VA (US); Joshua Zavilla, Washington, DC (US); Christopher Richbourg, Arlington, VA (US); Ryan Beiermeister, Washington, DC (US); Marc Frankel, New York City, NY (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/716,323

(22) Filed: Dec. 16, 2019

(65) Prior Publication Data
US 2020/0192531 A1    Jun. 18, 2020

Related U.S. Application Data

(63) Continuation of application No. 15/817,069, filed on Nov. 17, 2017, now Pat. No. 10,540,061, which is a
(Continued)

(51) Int. Cl.
*G06F 3/0482* (2013.01)
*G06F 3/0481* (2013.01)
(Continued)

(52) U.S. Cl.
CPC .......... *G06F 3/0482* (2013.01); *G06F 3/0481* (2013.01); *G06F 3/04817* (2013.01);
(Continued)

(58) Field of Classification Search
CPC .... G06F 3/0482; G06F 40/169; G06F 3/0481; G06F 3/04817; G06F 3/04842; G06F 3/04845; G06Q 10/109; G06Q 50/01
See application file for complete search history.

(56) References Cited

U.S. PATENT DOCUMENTS 9,823,818 B1   11/2017 Ryan et al.
10,540,061 B2   1/2020 Ryan et al.
(Continued)

OTHER PUBLICATIONS

U.S. Pat. No. 9,823,818, Systems and Interactive User Interfaces for Automatic Generation of Temporal Representation of Data Objects, Nov. 21, 2017.
(Continued)

*Primary Examiner* — Beau D Spratt
(74) *Attorney, Agent, or Firm* — Knobbe Martens Olson & Bear LLP

(57) ABSTRACT

Computer-implemented systems and methods are disclosed for automatically generating and displaying a chronology of events, where events may be represented by data objects in one or more databases. Events/data objects may be identified as relevant to an investigation or analysis based on specified criteria. A timeline may be generated based on the identified set of relevant events, and interactive user interfaces may be generated and displayed that present the events as a timeline and a list. Events may be selected from the timeline or the
(Continued)

list, may be identified as key events in the chronology, and additional events related to a selected event may be determined and added to the chronology. Timelines may be compared to other data sets, including other timelines, other event lists, and other relevant data.

20 Claims, 12 Drawing Sheets

Related U.S. Application Data continuation of application No. 15/092,456, filed on Apr. 6, 2016, now Pat. No. 9,823,818.

(60) Provisional application No. 62/272,526, filed on Dec. 29, 2015.

(51) Int. Cl.
| | | |
|---|---|---|
| *G06F 3/0484* | (2013.01) | |
| *G06T 11/20* | (2006.01) | |
| *G06Q 10/10* | (2012.01) | |
| *G06F 40/169* | (2020.01) | |
| *G06Q 50/00* | (2012.01) | |

(52) U.S. Cl.
CPC ...... *G06F 3/04842* (2013.01); *G06F 3/04845* (2013.01); *G06F 40/169* (2020.01); *G06Q 10/109* (2013.01); *G06T 11/206* (2013.01); *G06Q 50/01* (2013.01)

(56) References Cited

U.S. PATENT DOCUMENTS

| | | | |
|---|---|---|---|
| 2006/0156246 A1* | 7/2006 | Williams | G06F 16/58 715/764 |
| 2008/0082578 A1* | 4/2008 | Hogue | G06F 3/04845 |
| 2011/0113348 A1* | 5/2011 | Twiss | G06Q 10/10 715/753 |
| 2013/0191763 A1* | 7/2013 | Jones | H04L 67/36 715/753 |
| 2015/0378996 A1* | 12/2015 | Kesin | G06F 16/345 707/736 |
| 2016/0004764 A1* | 1/2016 | Chakerian | G06F 3/04842 707/737 |
| 2017/0031565 A1* | 2/2017 | Chauhan | G06F 3/04842 |

OTHER PUBLICATIONS

U.S. Pat. No. 10,540,061, Systems and Interactive User Interfaces for Automatic Generation of Temporal Representation of Data Objects, Jan. 21, 2020.

* cited by examiner

*Fig. 5F*

Investigation Edit Select Preferences Applications Help

Acme, Inc. Insider Trading Chronology – Timeline List

July 2015

| | | 1 | 2 | 3 | 4 |
| 5 | 6 | 7 | 8 | 9 | 10 | 11 |
| 12 | 13 | 14 | 15 | 16 | 17 | 18 |
| 19 | 20✉ | 21 | 22 | 23 | 24☎ |
| 26 | 27 | 28$ | 29 | 30 | 31 |

August 2015

| | | | | | | 1 |
| 2 | 3 | 4 | 5 | 6☎ | 7 | 8 |
| 9 | 10 | 11 | 12 | 13 | 14 | 15 |

| Type *554* | Date Range *556* | Title *558* | Participants *560* |
|---|---|---|---|
| Email | Jul 20, 2015 Mon, 03:56 PM | New information | WC -> DD |
| Phone Call | Jul 25, 2015 Fri, 10:02 AM – 10:20 AM | | WC -> DD |
| Stock Trade | Jul 28, 2015 Mon, 09:45 AM | | WC |
| Phone Call | Aug 6, 2015 | | DD -> WC |

500f

502

504

552

SYSTEMS AND INTERACTIVE USER INTERFACES FOR AUTOMATIC GENERATION OF TEMPORAL REPRESENTATION OF DATA OBJECTS

CROSS-REFERENCE TO RELATED APPLICATION

This application is a continuation of U.S. application Ser. No. 15/817,069, which is a continuation of U.S. application Ser. No. 15/092,456, now U.S. Pat. No. 9,823,818, which is a non-provisional of and claims priority to U.S. Provisional Application No. 62/272,526, each of which is hereby incorporated by reference in its entirety.

TECHNICAL FIELD

The present disclosure relates to systems and techniques for data integration, analysis, and visualization. More specifically, the present disclosure relates to systems and techniques for integrating, analyzing, and visualizing data through the automatic generation of a chronology user interface.

BACKGROUND

Electronic record-keeping produces data sets with thousands or millions of records. The sheer quantity of information available for analysis may prevent meaningful conclusions from being drawn, or may prevent connections between events from even being discovered. Filtering data based on relationships, events, and common characteristics and visually presenting the data in concise and informative ways can help users to identify data relevant to a particular time, place, or sequence of events.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to automatic generation of interactive user interfaces for presentation of chronologies. A chronology user interface may be utilized to identify a set of relevant events. The events may be identified according to specified criteria, by comparing events and determining common attributes, or may be identified based on inputs, as described below. An interactive user interface may then be generated that displays the events, for example, as a timeline and a list. The timeline and list may be interactive. For example, an event on the timeline may be selected based on user input, and additional information or related events may be displayed. Modifiable attributes of events, such as annotations or associated keywords, may be modified via the user interface.

Chronology user interfaces may be used to compare timelines and to present and analyze various theories regarding a set of events and the relationship between them.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

In an embodiment, a computer system is disclosed comprising a data store configured to store computer executable instructions, and a processor that, when executing the computer-executable instructions, is configured to: obtain a plurality of events, each of the plurality of events comprising a respective set of event attributes, the event attributes comprising at least an event timestamp; obtain one or more criteria associated with event attributes; determine, based at least in part on the one or more criteria, a set of relevant events within the plurality of events; generate for display a user interface based at least in part on the set of relevant events and the corresponding event attributes, the user interface comprising (1) a timeline interface for display of a timeline, wherein positions of individual relevant events within the timeline interface are determined based at least in part on respective event timestamps, and (2) a list interface for display of the relevant events; and cause display of the user interface.

In some embodiments, the event attributes further comprise at least one of an event source, an event type, an event icon, an event duration, an event title, a set of event participants, a set of event keywords, and a set of event annotations.

In some embodiments, the processor is further configured to: obtain input identifying a selected event displayed within the user interface; generate for display a first update to the user interface, the first update comprising (1) an indication of selection of the selected event within the timeline interface, and (2) an indication of selection of the selected event within the list interface; and cause display of the first update to the user interface.

In some embodiments, the processor is further configured to: determine that at least one of the plurality of events has been updated; generate an alert indicating that the at least one of the plurality of events has been updated; and cause transmission of the alert to a computing device, wherein transmission of the alert causes the computing device to activate an application for display of the alert, and wherein the alert enables display of an updated user interface, the updated user interface based at least in part on an updated event of the plurality of events.

In some embodiments, the processor is further configured to: determine, based at least in part on the selected event, one or more related events from within the plurality of events; generate for display an event selection interface for display of the one or more related events; and cause display of the event selection interface.

In some embodiments, the processor configured to determine the one or more related events is configured to determine the one or more related events based at least in part on one or more attributes of the selected event.

In some embodiments, the processor is further configured to obtain input identifying a related event within the one or more related events; generate for display a second update to the user interface, the second update comprising (1) display of the related event within the timeline interface and (2) display of the related event within the list interface; and cause display of the second update to the user interface.

In another embodiment, a computer-implemented method is disclosed comprising obtaining a plurality of events, each of the plurality of events comprising event attributes; determining, based at least in part on one or more criteria associated with event attributes, a set of relevant events within the plurality of events; generating for display a user interface based at least in part on the set of relevant events, the user interface comprising (1) a timeline interface for display of a timeline, wherein positions of individual relevant events within the timeline interface are determined based at least in part on respective event attributes, and (2) a list interface for display of the set of relevant events; and displaying the user interface.

In some embodiments, the timeline interface displays a subset of the set of relevant events as key events. In some embodiments, the event attributes include at least one configurable attribute, and in some embodiments the at least one configurable attribute comprises an event annotation, an event icon, an event description, or an event keyword.

In some embodiments, the computer-implemented method further comprises obtaining an input indicative of a modification of a configurable attribute for a relevant event; modifying the configurable attribute for the relevant event; generating for display a first update to the user interface, the first update comprising at least one of a modified configurable attribute within the timeline interface and a modified configurable attribute within the list interface; and causing display of the first update to the user interface.

In some embodiments, the computer-implemented method further comprises obtaining one or more updates to the plurality of events; determining, based at least in part on the one or more updates, an update to the set of relevant events; generating for display an alert message, the alert message indicating the update to the set of relevant alerts; and displaying the alert message.

In some embodiments, determining the update to the set of relevant events comprises at least one of determining an additional event to include in the set of relevant events, determining an event to remove from the set of relevant events, or determining a changed event attribute for an event in the set of relevant events.

In some embodiments, the computer-implemented method further comprises generating for display an updated user interface based at least in part on the update to the set of relevant events, the updated user interface comprising an updated timeline interface and an updated list interface; and displaying the updated user interface.

In another embodiment, a non-transitory computer-readable storage medium is disclosed, the non-transitory computer-readable storage medium including computer-executable instructions that, when executed by a processor, cause the processor to: determine, based at least in part on a first set of criteria, a first set of relevant events within a plurality of events; generate a first timeline corresponding to the first set of relevant events; generate for display a first user interface based at least in part on the first set of relevant events, the first user interface comprising (1) a timeline interface for display of at least a portion of the first timeline, wherein individual relevant events are positioned within the timeline interface based at least in part on respective attributes of the individual relevant events, and (2) a list interface for display of at least the portion of the first set of relevant events; and cause display of the first user interface.

In some embodiments, the computer-executable instructions further cause the processor to obtain the plurality of events. In some embodiments, the first set of criteria comprise one or more inputs, and each of the one or more inputs are indicative of a selection of a respective event. In some embodiments, the first set of criteria is associated with event attributes, and the first set of relevant events comprises events that satisfy the first set of criteria.

In some embodiments, the computer-executable instructions further cause the processor to determine, based at least in part on a second set of criteria, a second set of relevant events within the plurality of events; generate a second timeline corresponding to the second set of events; generate for display a second user interface based at least in part on the second set of relevant events; and cause display of the second user interface.

In some embodiments, the first set of relevant events and the second set of relevant events have at least one event in common. In some embodiments, the second user interface comprises a combined timeline interface for display of a combined timeline, the combined timeline comprising the first timeline and at least a portion of the second timeline; a first list interface for display of the first set of relevant events; and a second list interface for display the second set of relevant events. In some embodiments, the computer-executable instructions further cause the processor to generate the combined timeline based at least in part on the first timeline and the second timeline.

BRIEF DESCRIPTION OF THE DRAWINGS

Reference will now be made to the accompanying drawings, which illustrate exemplary embodiments of the present disclosure. In the drawings:

FIGS. 5A-5F are block diagrams of example user interfaces for presenting and interacting with chronologies in accordance with aspects of the present disclosure;

DETAILED DESCRIPTION

Figure 1:
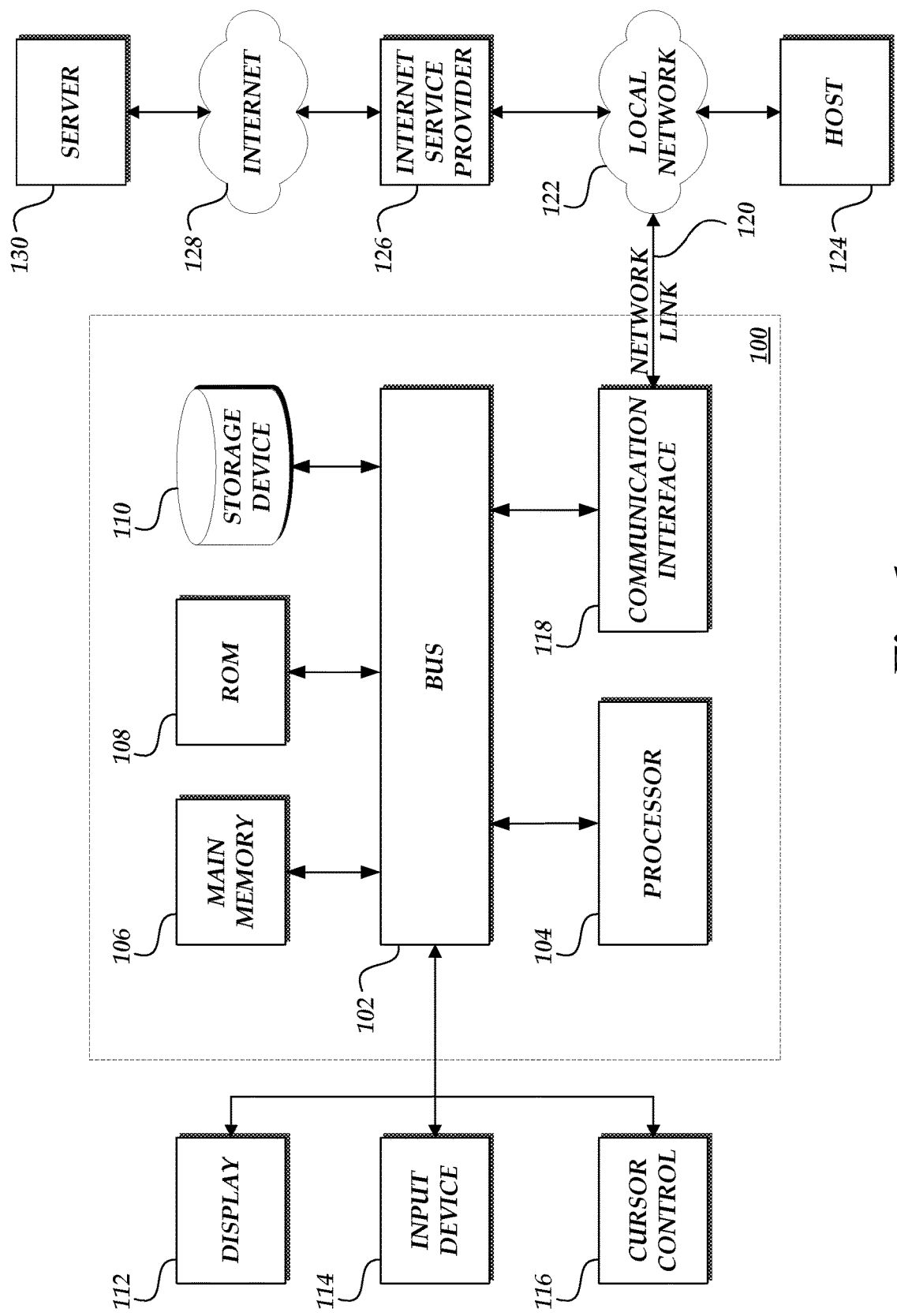
FIG. 1 is a block diagram of an example computer system consistent with embodiments of the present disclosure.

Reference will now be made in detail to example embodiments, the examples of which are illustrated in the accompanying drawings. Whenever possible, the same reference numbers will be used throughout the drawings to refer to the same or like parts.

Embodiments of the present disclosure relate to systems, methods, and computer-readable mediums for automatically generating and displaying a chronology. A chronology system obtains criteria for identifying a set of relevant events, and automatically generates for display an interactive user interface. The system processes input to designate key events, identify related events, and specify annotations or other modifiable attributes. Chronologies may be compared to each other, or to other data sets, to facilitate analysis and investigation.

According to some embodiments, the operations, techniques, and/or components described herein can be implemented by an electronic device, which can include one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques and/or components described herein, or can include one or more hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the technique and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more special-purpose computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Operating systems control and schedule computer processes for execution, perform memory management, provide file system, networking, I/O services, and provide a user interface functionality, such as a graphical user interface ("GUI"), among other things.

In various embodiments of the present disclosure, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. Additionally, various embodiments of the present disclosure are inextricably tied to computer technology. In particular, various embodiments rely on detection of user inputs via graphical user interfaces, calculation of updates to displayed electronic data based on those user inputs, automatic processing of related events, and presentation of the updates to displayed chronologies via interactive graphical user interfaces. Such features and others are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic image data.

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Ontology: Stored information that provides a data model for storage of data in one or more databases. For example, the stored data may comprise definitions for object types and property types for data in a database, and how objects and properties may be related.

Database: A broad term for any data structure for storing and/or organizing data, including, but not limited to, relational databases (Oracle database, mySQL database, etc.), non-relational databases (for example, a NoSQL database), an in-memory database, spreadsheets, XML files, and text file, among others. The various terms "database," "storage," "data store," and "data source" may be used interchangeably in the present disclosure.

Data Object or Object: A data container for information representing specific things in the world that have a number of definable properties. For example, a data object can represent an entity such as a person, a place, an organization, a market instrument, or other noun. A data object can represent an event that happens at a point in time or for a duration. A data object can represent a document or other unstructured data source such as an e-mail message, a news report, or a written paper or article. Each data object may be associated with a unique identifier that uniquely identifies the data object. The object's attributes (e.g. metadata about the object) may be represented in one or more properties.

Object Type: Type of a data object (e.g., Person, Event, or Document). Object types may be defined by an ontology and may be modified or updated to include additional object types. An object definition (e.g., in an ontology) may include how the object is related to other objects, such as being a sub-object type of another object type (e.g. an agent may be a sub-object type of a person object type), and the properties the object type may have.

Properties: Attributes of a data object that represent individual data items. At a minimum, each property of a data object has a property type and a value or values. May also be referred to herein as "attributes."

Property Type: The type of data a property is, such as a string, an integer, or a double. Property types may include complex property types, such as a series data values associated with timed ticks (e.g. a time series), etc. May also be referred to herein as "attribute types."

Property Value: The value associated with a property, which is of the type indicated in the property type associated with the property. A property may have multiple values. May also be referred to herein as "attribute values."

Link: A connection between two data objects, based on, for example, a relationship, an event, and/or matching properties. Links may be directional, such as one representing a payment from person A to B, or bidirectional.

Link Set: Set of multiple links that are shared between two or more data objects.

Example Devices/Systems

By way of example, FIG. 1 is a block diagram that illustrates an implementation of an electronic device 100, which, as described above, can comprise one or more electronic devices. Electronic device 100 includes a bus 102 or other communication mechanism for communicating information, and one or more hardware processors 104, coupled with bus 102 for processing information. One or more hardware processors 104 can be, for example, one or more microprocessors.

Electronic device 100 also includes a main memory 106, such as a random access memory (RAM) or other dynamic storage device, coupled to bus 102 for storing information and instructions to be executed by processor 104. Main memory 106 also can be used for storing temporary variables or other intermediate information during execution of instructions to be executed by processor 104. Such instructions, when stored in non-transitory storage media accessible to one or more processors 104, render electronic device 100 into a special-purpose machine that is customized to perform the operations specified in the instructions.

Electronic device 100 further includes a read only memory (ROM) 108 or other static storage device coupled to bus 102 for storing static information and instructions for processor 104. A storage device 110, such as a magnetic disk, optical disk, or USB thumb drive (Flash drive), etc., is provided and coupled to bus 102 for storing information and instructions.

Electronic device 100 can be coupled via bus 102 to a display 112, such as a cathode ray tube (CRT), an LCD display, or a touchscreen, for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Electronic device 100 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, and C++. A software module can be compiled and linked into an executable program, installed in a dynamic link library, or written in an interpreted programming language such as, for example, BASIC, Perl, Python, or Ruby. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Electronic device 100 can implement the techniques and other features described herein using customized hard-wired logic, one or more ASICs or FPGAs, firmware and/or program logic which in combination with the electronic device causes or programs electronic device 100 to be a special-purpose machine. According to some embodiments, the techniques and other features described herein are performed by electronic device 100 in response to one or more processors 104 executing one or more sequences of one or more instructions contained in main memory 106. Such instructions can be read into main memory 106 from another storage medium, such as storage device 150. Execution of the sequences of instructions contained in main memory 106 causes processor 104 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 110. Volatile media includes dynamic memory, such as main memory 106. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire, and fiber optics, including the wires that comprise bus 102. Transmission media can also take the form of acoustic or light waves, such as those generated during radio wave and infrared data communications.

Various forms of media can be involved in carrying one or more sequences of one or more instructions to processor 104 for execution. For example, the instructions can initially be carried on a magnetic disk or solid-state drive of a remote computer. The remote computer can load the instructions into its dynamic memory and send the instructions over a telephone line using a modem. A modem local to electronic device 100 can receive the data on the telephone line and use an infrared transmitter to convert the data to an infrared signal. An infrared detector can receive the data carried in the infrared signal and appropriate circuitry can place the data on bus 102. Bus 102 carries the data to main memory 106, from which processor 104 retrieves and executes the instructions. The instructions received by main memory 106 can optionally be stored on storage device 150 either before or after execution by processor 104.

Electronic device 100 also includes a communication interface 118 coupled to bus 102. Communication interface 118 provides a two-way data communication coupling to a network link 120 that is connected to a local network 122. For example, communication interface 118 can be an integrated services digital network (ISDN) card, cable modem, satellite modem, or a modem to provide a data communication connection to a corresponding type of telephone line. As another example, communication interface 118 can be a local area network (LAN) card to provide a data communication connection to a compatible LAN. Wireless links can also be implemented. In any such implementation, communication interface 118 sends and receives electrical, electromagnetic, or optical signals that carry digital data streams representing various types of information.

Network link 120 typically provides data communication through one or more networks to other data devices. For example, network link 120 can provide a connection through local network 122 to a host computer 124 or to data equipment operated by an Internet Service Provider (ISP) 126. ISP 126 in turn provides data communication services through the worldwide packet data communication network now commonly referred to as the "Internet" 128. Local network 122 and Internet 128 both use electrical, electromagnetic, or optical signals that carry digital data streams. The signals through the various networks and the signals on network link 120 and through communication interface 118, which carry the digital data to and from electronic device 100, are example forms of transmission media.

Electronic device 100 can send messages and receive data, including program code, through the network(s), network link 120 and communication interface 118. In the Internet example, a server 130 might transmit a requested code for an application program through Internet 128, ISP 126, local network 122, and communication interface 118. The received code can be executed by processor 104 as it is received, and/or stored in storage device 150 or other non-volatile storage for later execution. In some embodiments, server 130 can provide information for being displayed on a display, such as display 112.

Example Data Model

Figure 2:
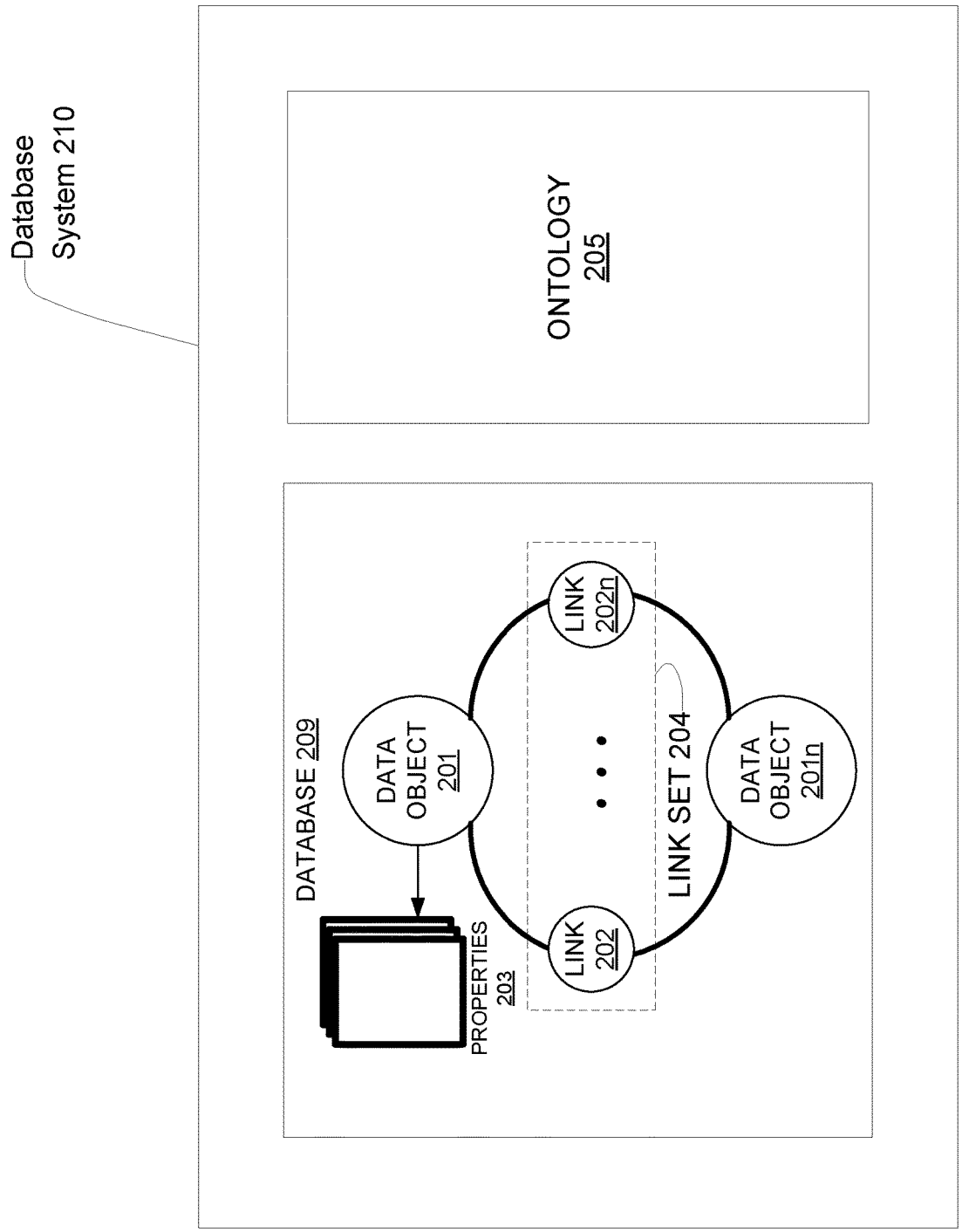
FIG. 2 illustrates one embodiment of a database system using an ontology.

With reference now to FIG. 2, and to provide a framework for the following discussion of specific systems and methods described herein, an example database system 210 using an ontology 205 will now be described. This description is provided for the purpose of providing an example and is not intended to limit the techniques to the example data model, the example database system, or the example database system's use of an ontology to represent information.

In one embodiment, a body of data is conceptually structured according to an object-centric data model represented by ontology 205. The conceptual data model is independent of any particular database used for durably storing one or more database(s) 209 based on the ontology 205. For example, each object of the conceptual data model may correspond to one or more rows in a relational database or an entry in Lightweight Directory Access Protocol (LDAP) database, or any combination of one or more databases.

FIG. 2 illustrates an object-centric conceptual data model according to an embodiment. An ontology 205, as noted above, may include stored information providing a data model for storage of data in the database 209. The ontology 205 may be defined by one or more object types, which may each be associated with one or more property types. At the highest level of abstraction, data object 201 is a container for information representing things in the world. For example, data object 201 can represent an entity such as a person, a place, an organization, a market instrument, or other noun. Data object 201 can represent an event that happens at a point in time or for a duration. Data object 201 can represent a document or other unstructured data source such as an e-mail message, a news report, or a written paper or article.

Each data object 201 is associated with a unique identifier that uniquely identifies the data object within the database system.

Different types of data objects may have different property types. For example, a "Person" data object might have an "Eye Color" property type and an "Event" data object might have a "Date" property type. Each property 203 as represented by data in the database system 210 may have a property type defined by the ontology 205 used by the database 209.

Objects may be instantiated in the database 209 in accordance with the corresponding object definition for the particular object in the ontology 205. For example, a specific monetary payment (e.g., an object of type "event") of US$30.00 (e.g., a property of type "currency") taking place on Mar. 27, 2009 (e.g., a property of type "date") may be stored in the database 209 as an event object with associated currency and date properties as defined within the ontology 205.

The data objects defined in the ontology 205 may support property multiplicity. In particular, a data object 201 may be allowed to have more than one property 203 of the same property type. For example, a "Person" data object might have multiple "Address" properties or multiple "Name" properties.

Each link 202 represents a connection between two data objects 201. In one embodiment, the connection is either through a relationship, an event, or through matching properties. A relationship connection may be asymmetrical or symmetrical. For example, "Person" data object A may be connected to "Person" data object B by a "Child Of" relationship (where "Person" data object B has an asymmetric "Parent Of" relationship to "Person" data object A), a "Kin Of" symmetric relationship to "Person" data object C, and an asymmetric "Member Of" relationship to "Organization" data object X. The type of relationship between two data objects may vary depending on the types of the data objects. For example, "Person" data object A may have an "Appears In" relationship with "Document" data object Y or have a "Participate In" relationship with "Event" data object E. As an example of an event connection, two "Person" data objects may be connected by an "Airline Flight" data object representing a particular airline flight if they traveled together on that flight, or by a "Meeting" data object representing a particular meeting if they both attended that meeting. In one embodiment, when two data objects are connected by an event, they are also connected by relationships, in which each data object has a specific relationship to the event, such as, for example, an "Appears In" relationship.

As an example of a matching properties connection, two "Person" data objects representing a brother and a sister, may both have an "Address" property that indicates where they live. If the brother and the sister live in the same home, then their "Address" properties likely contain similar, if not identical property values. In one embodiment, a link between two data objects may be established based on similar or matching properties (e.g., property types and/or property values) of the data objects. These are just some examples of the types of connections that may be represented by a link and other types of connections may be represented; embodiments are not limited to any particular types of connections between data objects. For example, a document might contain references to two different objects. For example, a document may contain a reference to a payment (one object), and a person (a second object). A link between these two objects may represent a connection between these two entities through their co-occurrence within the same document.

Each data object 201 can have multiple links with another data object 201 to form a link set 204. For example, two "Person" data objects representing a husband and a wife could be linked through a "Spouse Of" relationship, a matching "Address" property, and one or more matching "Event" properties (e.g., a wedding). Each link 202 as represented by data in a database may have a link type defined by the database ontology used by the database.

Figure 3:
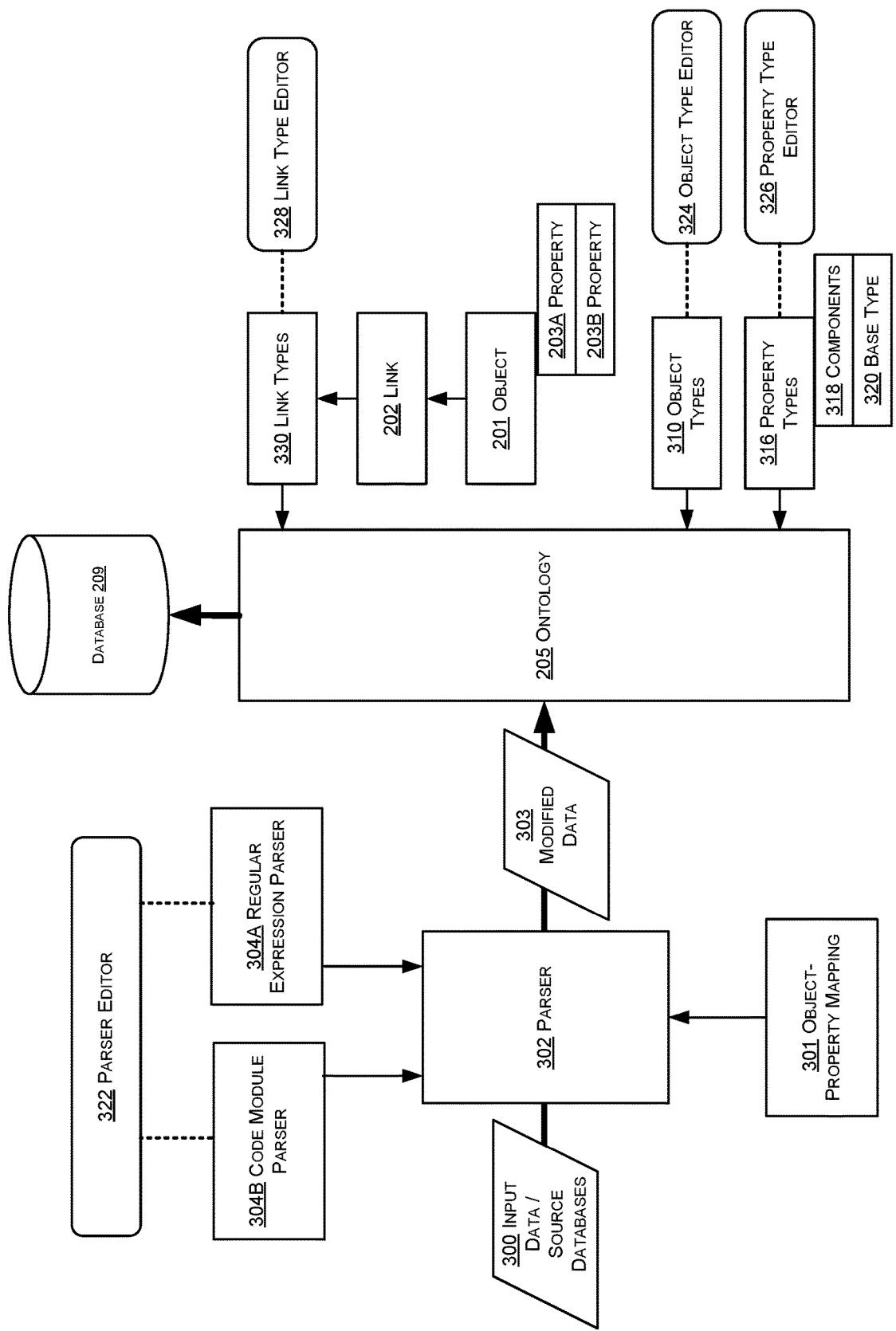
FIG. 3 illustrates one embodiment of a system for creating data in a data store using a dynamic ontology.

FIG. 3 is a block diagram illustrating exemplary components and data that may be used in identifying and storing data according to an ontology. In this example, the ontology may be configured, and data in the data model populated, by a system of parsers and ontology configuration tools. In the embodiment of FIG. 3, input data 300 is provided to parser 302. The input data may comprise data from one or more sources. For example, an institution may have one or more databases with information on credit card transactions, rental cars, and people. The databases may contain a variety of related information and attributes about each type of data, such as a "date" for a credit card transaction, an address for a person, and a date for when a rental car is rented. The parser 302 is able to read a variety of source input data types and determine which type of data it is reading.

In accordance with the discussion above, the example ontology 205 comprises stored information providing the data model of data stored in database 209, and the ontology is defined by one or more object types 310, one or more property types 316, and one or more link types 330. Based on information determined by the parser 302 or other mapping of source input information to object type, one or more data objects 201 may be instantiated in the database 209 based on respective determined object types 310, and each of the objects 201 has one or more properties 203 that are instantiated based on property types 316. Two data objects 201 may be connected by one or more links 202 that may be instantiated based on link types 330. The property types 316 each may comprise one or more data types 318, such as a string, number, etc. Property types 316 may be instantiated based on a base property type 320. For example, a base property type 320 may be "Locations" and a property type 316 may be "Home."

In an embodiment, a user of the system uses an object type editor 324 to create and/or modify the object types 310 and define attributes of the object types. In an embodiment, a user of the system uses a property type editor 326 to create and/or modify the property types 316 and define attributes of the property types. In an embodiment, a user of the system uses link type editor 328 to create the link types 330. Alternatively, other programs, processes, or programmatic controls may be used to create link types and property types and define attributes, and using editors is not required.

In an embodiment, creating a property type 316 using the property type editor 326 involves defining at least one parser definition using a parser editor 322. A parser definition comprises metadata that informs parser 302 how to parse input data 300 to determine whether values in the input data can be assigned to the property type 316 that is associated with the parser definition. In an embodiment, each parser definition may comprise a regular expression parser 304A or a code module parser 304B. In other embodiments, other kinds of parser definitions may be provided using scripts or other programmatic elements. Once defined, both a regular expression parser 304A and a code module parser 304B can provide input to parser 302 to control parsing of input data 300.

Using the data types defined in the ontology, input data 300 may be parsed by the parser 302 determine which object type 310 should receive data from a record created from the input data, and which property types 316 should be assigned to data from individual field values in the input data. Based on the object-property mapping 301, the parser 302 selects one of the parser definitions that is associated with a property type in the input data. The parser parses an input data field using the selected parser definition, resulting in creating new or modified data 303. The new or modified data 303 is added to the database 209 according to ontology 205 by storing values of the new or modified data in a property of the specified property type. As a result, input data 300 having varying format or syntax can be created in database 209. The ontology 205 may be modified at any time using object type editor 324, property type editor 326, and link type editor 328, or under program control without human use of an editor. Parser editor 322 enables creating multiple parser definitions that can successfully parse input data 300 having varying format or syntax and determine which property types should be used to transform input data 300 into new or modified input data 303.

In an embodiment, the sources of input data 300 may themselves be stored or made available. For example, a user may provide a source document containing input data 300 that is processed by parser 302 as described above. The source document may be stored in the database 209 and associated with data objects 201 that are instantiated when parsing the source document. The source document may be made available when accessing data objects 201 associated with it, e.g., via the graphical user interface described below. In another embodiment, a user may provide a reference to a source document, such as a uniform resource locator (URL) or an Application Programming Interface (API) call that provides access to the source document. The reference may be utilized by the parser 302 to access and parse the source document, and may be associated with data objects 201 that are instantiated when parsing the source document. In still another embodiment, an API may be provided that allows sources of input data 300 to provide their data in a specified format.

The properties, objects, and links (e.g. relationships) between the objects can be visualized using a graphical user interface (GUI). For example, FIG. 4 displays a user interface showing a graph representation 403 of relationships (including relationships and/or links 404, 405, 406, 407, 408, 409, 410, 411, 412, and 413) between the data objects (including data objects 421, 422, 423, 424, 425, 426, 427, 428, and 429) that are represented as nodes in the example of FIG. 4. In this embodiment, the data objects include person objects 421, 422, 423, 424, 425, and 426; a flight object 427; a financial account 428; and a computer object 429. In this example, each person node (associated with person data objects), flight node (associated with flight data objects), financial account node (associated with financial account data objects), and computer node (associated with computer data objects) may have relationships and/or links with any of the other nodes through, for example, other objects such as payment objects.

Figure 4:
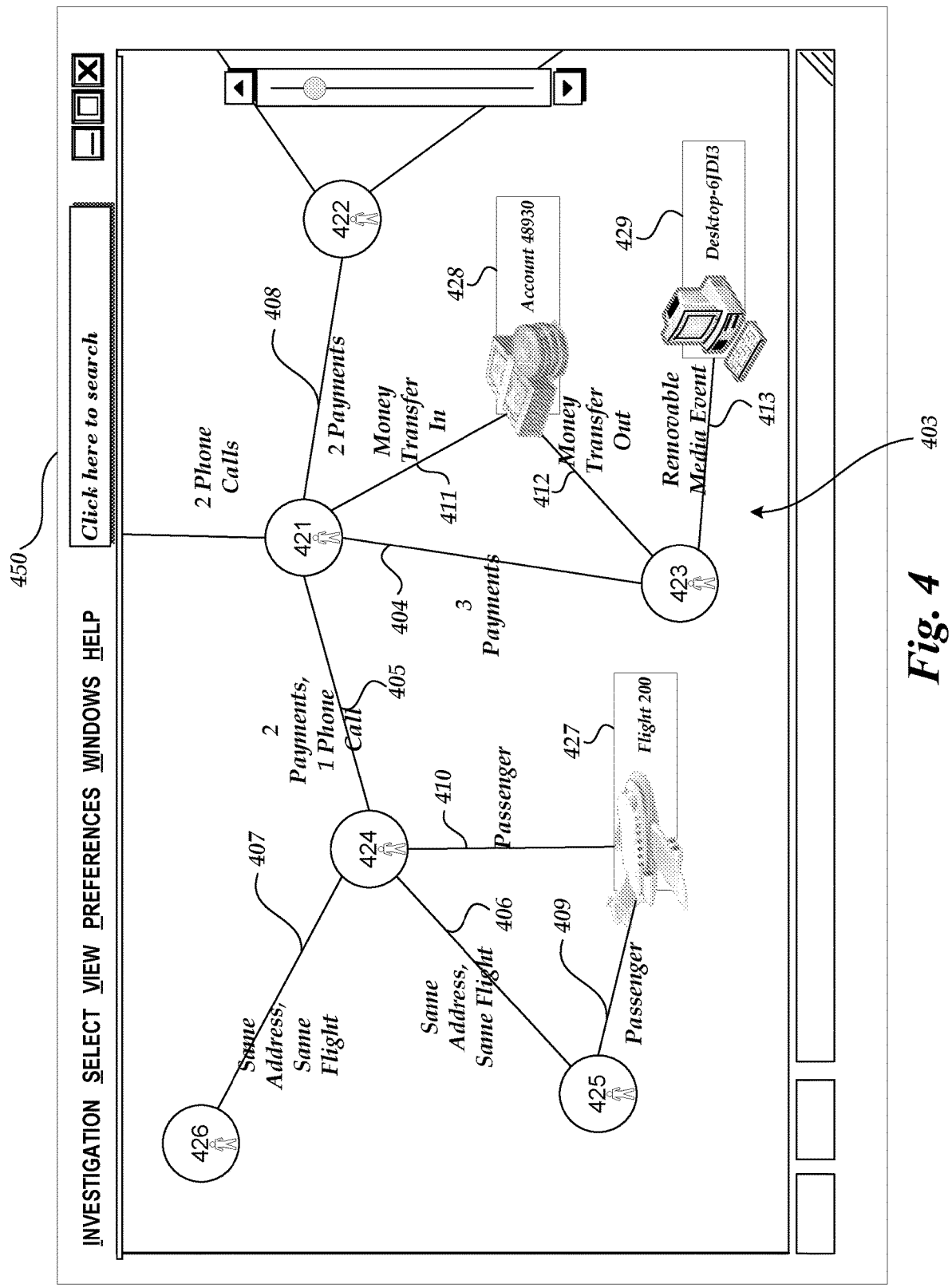
FIG. 4 illustrates a sample user interface using relationships described in a data store using a dynamic ontology.

For example, in FIG. 4, relationship 404 is based on a payment associated with the individuals indicated in person data objects 421 and 423. The link 404 represents these shared payments (for example, the individual associated with data object 421 may have paid the individual associated with data object 423 on three occasions). The relationship is further indicated by the common relationship between person data objects 421 and 423 and financial account data object 428. For example, link 411 indicates that person data object 421 transferred money into financial account data object 428, while person data object 423 transferred money out of financial account data object 428. In another example, the relationships between person data objects 424 and 425 and flight data object 427 are indicated by links 406, 409, and 410. In this example, person data objects 424 and 425 have a common address and were passengers on the same flight data object 427. In an embodiment, further details related to the relationships between the various objects may be displayed. For example, links 411 and 412 may, in some embodiments, indicate the timing of the respective money transfers. In another example, the time of the flight associated with the flight data object 427 may be shown.

Relationships between data objects may be stored as links, or in some embodiments, as properties, where a relationship may be detected between the properties. In some cases, as stated above, the links may be directional. For example, a payment link may have a direction associated with the payment, where one person object is a receiver of a payment, and another person object is the payer of payment.

In addition to visually showing relationships between the data objects, the user interface may allow various other manipulations. For example, the objects within database 209 may be searched using a search interface 450 (e.g., text string matching of object properties), inspected (e.g., properties and associated data viewed), filtered (e.g., narrowing the universe of objects into sets and subsets by properties or relationships), and statistically aggregated (e.g., numerically summarized based on summarization criteria), among other operations and visualizations. As a further example, the objects within database 209 may be associated with source documents, as described above, and the source documents may be inspected or exported when viewing associated objects. In some embodiments, selecting a source document for inspection may cause display of a separate user interface (e.g., in a separate window, document viewer, browser, or other application).

Example User Interfaces

With reference now to FIGS. 5A-5F, examples of user interfaces 500a-f for presentation of chronology information will be described. FIGS. 5A-5F depict simplified interfaces for purposes of illustration, and user interfaces 500a-f may have more or fewer components within the scope of the present disclosure. As non-limiting examples, user interfaces 500 may be implemented as a web page displayed via a web browser, or as an application executing on a tablet, mobile, or other computing device, such as the electronic device 100 and display 112 of FIG. 1.

Figure 5A:
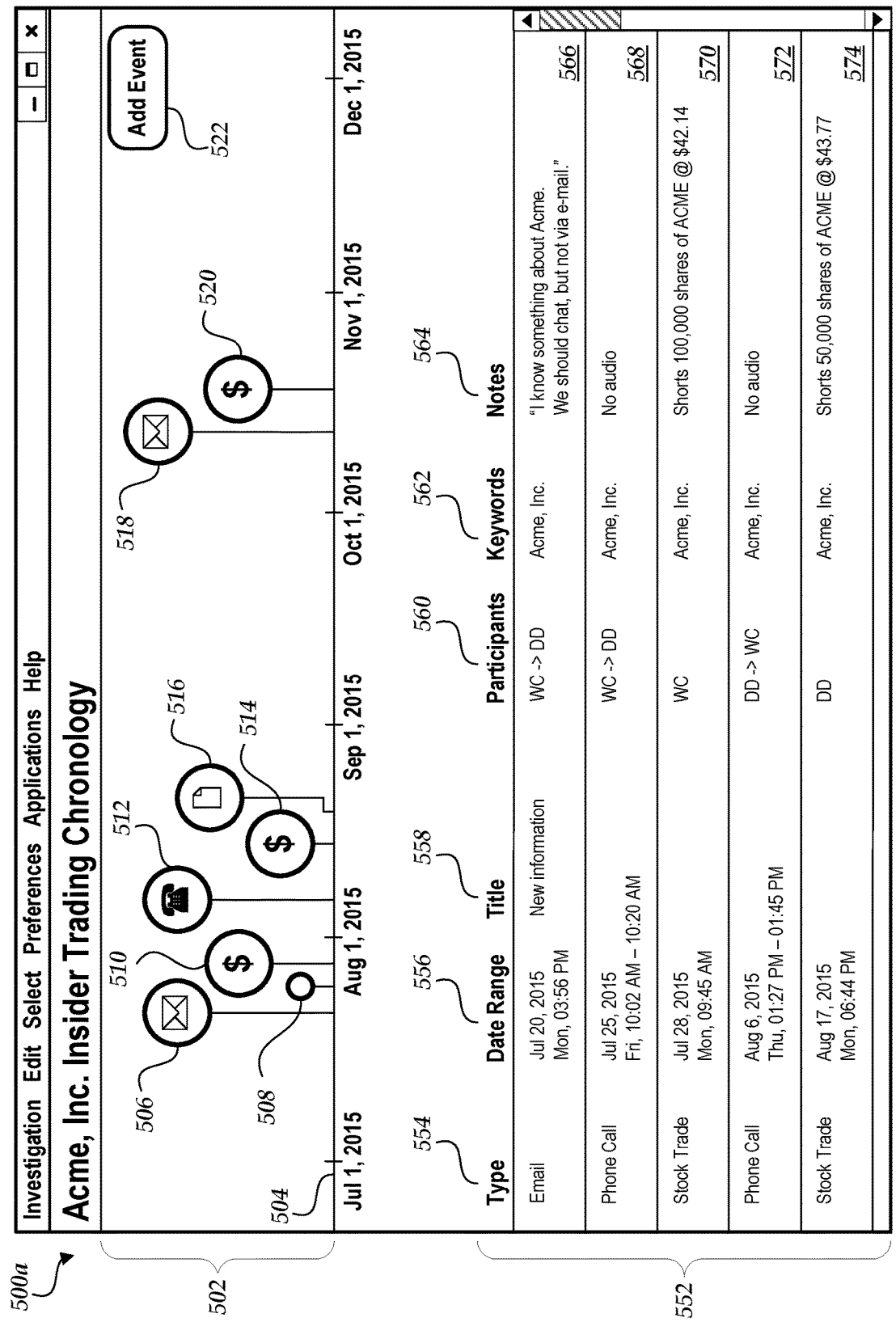

Turning now to FIG. 5A, the illustrated user interface 500a includes a timeline interface 502. The timeline interface 502 includes timeline 504, which displays event icons 506-520 in chronological order. In some embodiments timeline 504 may be interactive, such that inputs received from a touchscreen or input device cause the timeline to scroll, zoom, or change the amount of detail displayed with regard to the event icons 506-520.

Event icons 506-520 correspond to a set of events (e.g., representing data objects of the type "event" and/or representing relationships among data objects, as described above) that are relevant to an investigation or analysis. In some embodiments, some or all of the relevant events may be obtained or determined based on criteria, such as events associated with a particular source, activity, participant, or other attribute. In other embodiments, the events displayed in the timeline interface 502 may be identified via inputs received from a touchscreen or input device. For example, input indicating that button 522 has been tapped or clicked may cause display of a separate interface for adding an event to the timeline. In further embodiments, timeline interface 502 or list interface 552 may be responsive to drag-and-drop input, such that dragging and dropping an event onto the timeline interface 502 or list interface 552 causes the event to be added to the set of relevant events and an additional event icon to be added to the timeline 504. For example, in some embodiments data objects may be dragged from one user interface (such as a user interface similar to the user interface of FIG. 4) to another user interface (such as the user interface of FIG. 5A) to add an event corresponding to the dragged data object to the set of events.

In the illustrated example, the events for which icons 506-520 are displayed relate to insider trading. Such events may be identified, for example, based on keyword criteria (e.g., a common company or stock symbol) or participant criteria (e.g., participants WC and DD) within a relevant timeframe. Although insider trading events are depicted for purposes of example, the present disclosure is not limited to a particular type of investigation or analysis. As non-limiting examples, a chronology user interface may be used to analyze and present events related to law enforcement (criminal investigations, prosecutions, defenses, anti-money laundering investigations, investigations into events leading up to use of a weapon (e.g., by a law enforcement officer), etc.), cybersecurity, finance (stock portfolios, loans, etc.), health issues (treatment plans, clinical drug trials, disease vectors, etc.), public safety, product marketing, anti-bribery workflows, cyber fraud detection, cyber breach detection, triage and analysis, investigations into consumer churn and retention (e.g., macro analysis (e.g., all customers), micro analysis (e.g., customer specific), analysis of events/trends that lead to a customer (or group) adopting or leaving products, buying more products, etc.), and/or other events that may be presented and analyzed chronologically.

Events 506-520 may correspond to various event categories or types, and may be displayed in the timeline interface 502 accordingly. As a non-limiting example, event 506 may correspond to transmission or receipt of an email message, and may accordingly be presented in the timeline interface 502 with a "mail" symbol or other designation. As further non-limiting examples, events 512, 514, and 520 may correspond to financial transactions (e.g., stock trades) occurring at the indicated times, events 508 and 512 may correspond to telephone calls, and event 516 may correspond to a document (e.g., an earnings report or press release) that was issued on the date and time indicated by the line connecting event 516 to the timeline 504. In various embodiments, some or all of events 506-520 may be labeled according to an event category, participant, source, keyword, annotation, or other attribute. In some embodiments, event labels or icons may be selected in response to input. For example, input may be received indicating that event participants should be displayed as icons. Although a particular embodiment is illustrated in FIGS. 5A-5D, one skilled in the art will understand that aspects of the present disclosure include various labels and representations. For example, event icons may be displayed in color, with the icon indicating the event type and the colors indicating participants, such that a blue "dollar sign" symbol indicates a stock trade performed by participant WC, and a blue-green "telephone" symbol indicates a phone call between participants WC and DD.

In FIG. 5A, event 508 is displayed in a minimized format that does not include an event icon. Illustratively, timeline interface 502 may display events in a minimized format to conserve space. In some embodiments, certain events in the timeline may be identified as key events, and the timeline interface 502 may display only the key events in the larger format. Key events may be identified, for example, according to specified criteria, via inputs obtained via the user interface 500, or combinations thereof. In further embodiments, a number of minimized formats may be utilized, and a particular minimized format may be selected based on, for example, the number of events on the timeline 504, the scope of the timeline 504, the size of the display, or other factors.

In some embodiments, the appearance or format of event icons 506-520 may be modified or customized. For example, events may be color-coded according to event type, participants, source, or other criteria. Event icons 506-520 may further be customized to display different icon shapes or symbols, or to display annotations or other attributes associated with some or all of the events.

The illustrated user interface 500a further includes a list interface 552. The list interface 552 displays the set of relevant events 506-520 in a list format. In the depicted embodiment, non-limiting examples of various event attributes are displayed in columns 554-564. For example, column 554 contains an event type or category, such as an email message, phone call, or stock trade. The event categories displayed in column 554 may correspond to event icons displayed in the timeline interface 502. As a further example, column 556 contains a date or date range associated with the event, which may correspond to the position of events in the timeline interface 502. The timeline interface 502 may not display corresponding information for all columns in the list interface 552. In FIG. 5A, the title column 558, participant column 560, keywords column 562, and notes column 564 are examples of event attributes that may not be displayed in the timeline interface. In some embodiments, columns of the list interface 552 may be selectable, and selection of a column may cause the selected attribute to be displayed or highlighted in the timeline interface 502.

The list interface 552 further includes event rows 566-574, which correspond to event icons 506-514 in the timeline interface 502. The list interface 552 may be scrollable, and input to the list interface 552 may cause, for example, rows corresponding to event icons 516-520 to scroll into view. In some embodiments, the list interface 552 may enable input or modification of event attributes that are modifiable, such as keywords, notes, or other attributes associated with the event. Other attributes, such as the date and participants in a phone call or other events, may not be modifiable.

Figure 5B:
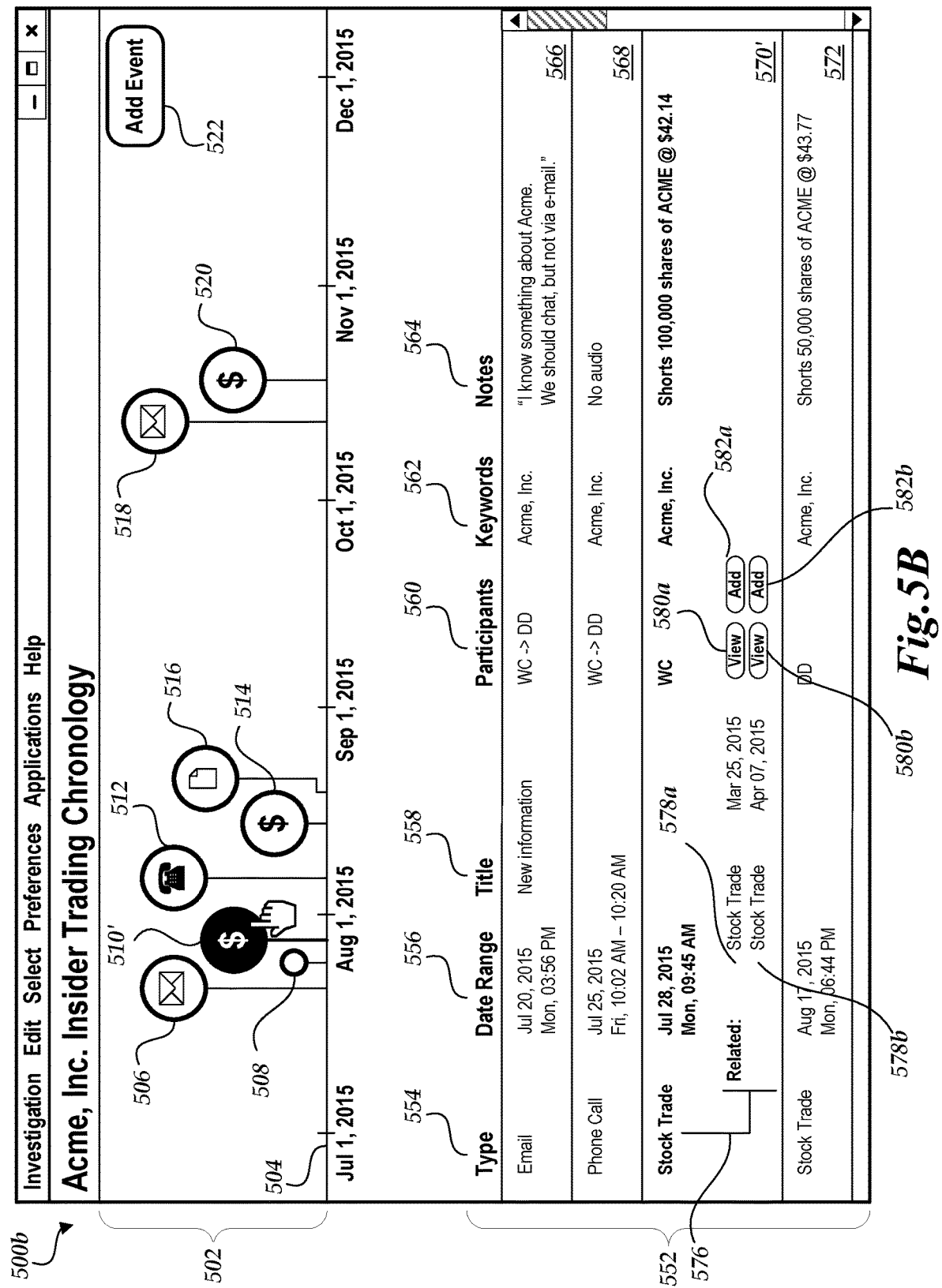

With reference now to FIG. 5B, an example interface 500b for selecting displayed events and adding related events to the chronology will be described. Interface 500b may be displayed, for example, as a modification or update to interface 500a. Accordingly, only the elements of interface 500b that differ relative to interface 500a will be described.

In FIG. 5B, the timeline interface 502 has obtained a selection input. The selection input is illustrated as a hand cursor in the depicted embodiment, and indicates selection of the event associated with event icon 510 of FIG. 5A. The timeline interface 502 of FIG. 5B has accordingly updated to display event icon 510', highlighting the selection. Because row 570 of the list interface 552 of FIG. 5A also corresponds to the selected event, the list interface 552 has updated to include row 570', which highlights the selected event in the list. In some embodiments, events associated with audio or video, such as the telephone call event associated with event icon 512, may present the associated audio or video, or may present user interface controls for accessing the audio or video, when the corresponding event is selected in the timeline interface 502 or list interface 552.

Selected row 570' further includes a list of related events 576. As described in more detail below, the chronology system may identify one or more events related to the selected event. Events may be identified as being related to the selected event, for example, by having common attributes. For example, a selected event may be a telephone call between parties X and Y at a particular date and time, and the related events may be other telephone calls between X and Y at other times. In FIG. 5B, the list of related events 576 includes rows 578a and 578b, each of which contains the attributes of a related event. Event rows 578a and 578b also include buttons 580a and 580b for viewing additional information regarding the respective event, and buttons 582a and 582b for adding the event to the chronology.

In some embodiments, interface 500b may include controls for modifying or customizing the appearance of a selected event icon, as described above. For example, the timeline interface 502 may display controls for annotating the selected event, and may display an annotation for the selected event icon 510'. As a further example, the list interface 552 may display controls for editing the modifiable attributes of a selected event.

Figure 5C:
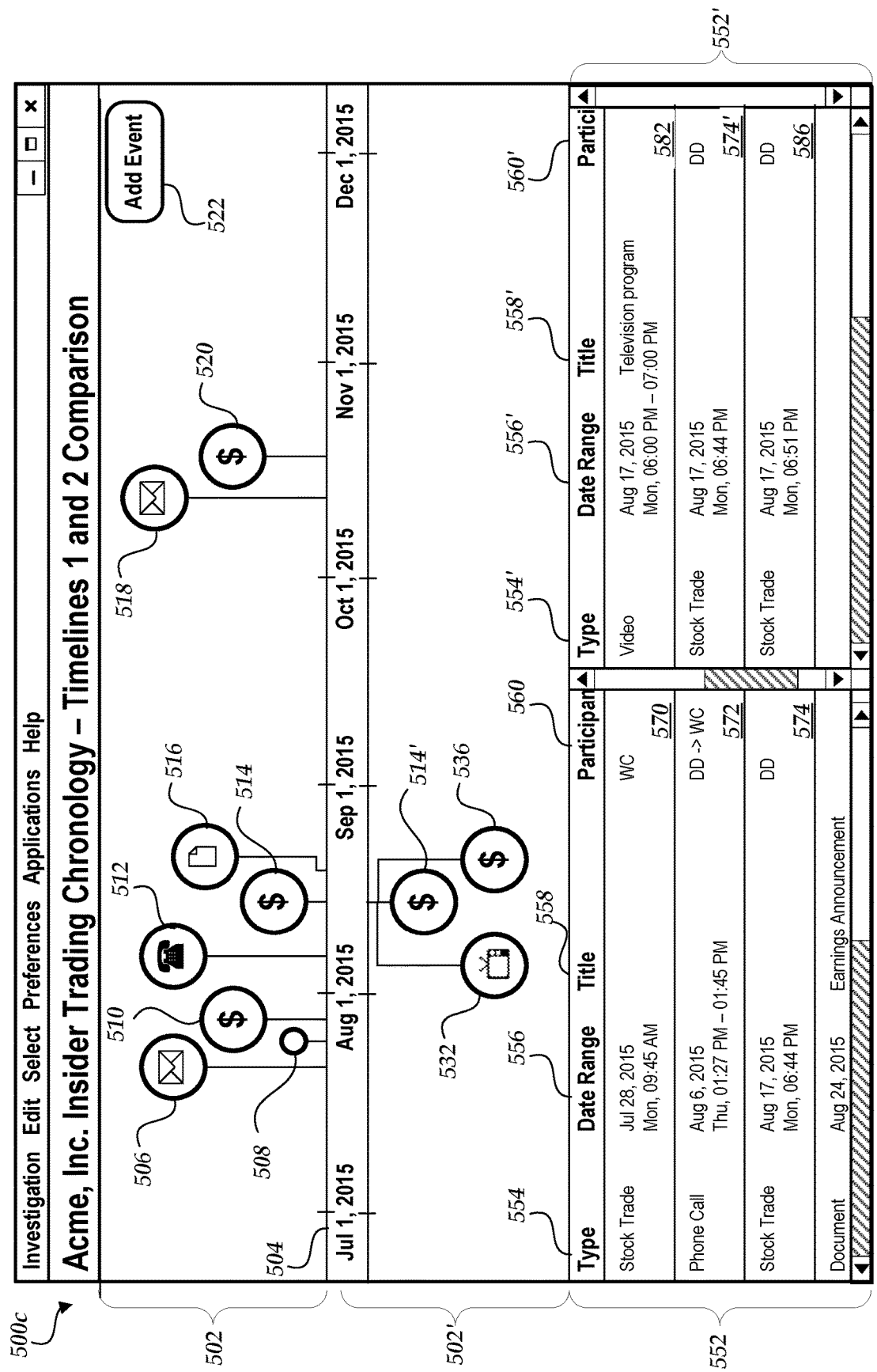

FIG. 5C depicts an example interface 500c for comparing timelines. Interface 500c may be displayed, for example, as a modification or update to interface 500a. Accordingly, only the elements of interface 500c that differ relative to interface 500a will be described.

Interface 500c includes a second timeline interface 502', which displays a second set of event icons 532, 514', and 536 relative to the timeline 504 presented by timeline interface 502. For example, in the embodiment illustrated in FIG. 5C, the first timeline interface 502 is displayed above the timeline 504 and the second timeline interface 502' is displayed below the timeline 504, which is common to both interfaces. In other embodiments (not depicted in FIG. 5C), the second timeline interface 502' may overlap the first timeline interface 502. For example, the second set of event icons 532, 514', and 536 may be displayed using a different color, shape, font, size, style, or otherwise distinguished from the first set of event icons 506-520. In further embodiments, the second timeline interface 502' may include its own timeline 504' rather than sharing a common timeline 504 with the first timeline interface 502.

Event icons 532, 514', and 536 correspond to a second set of events. The second set of events may be relevant to the same investigation or analysis as the first set of events, or in some embodiments may represent an alternative theory of the case. In the embodiment illustrated in FIG. 5C, the first timeline interface 502 includes a series of events suggestive of insider trading, and the second timeline interface 502' presents an alternate set of events that suggest trading based on publicly available information. For example, event icon 532, displaying a "television" symbol, corresponds to a television program airing at the time indicated by its position on the timeline 504. Event icon 514' corresponds to a stock trade that occurred during the airing of the television program, and further corresponds to event icon 514 of the first timeline interface 502. That is, the stock trade associated with event icons 514 and 514' is included in both the first set and the second set of events. Event icon 516 corresponds to a second stock trade during the airing of the television program.

In some embodiments, interface 500c includes a second list interface 552', which includes columns 554'-560' and event rows 582, 574', and 586. Event rows 582, 574' and 586 correspond to the events associated with icons 532, 514', and 516 respectively, and row 574' in the second list interface 552' corresponds to row 574 in the first list interface 552. In other embodiments, a single list interface 552 may include events from both timelines 502 and 502'. Illustratively, a single list interface 552 may display the events of the first timeline 502 distinctly from the events of the second timeline 502', using elements such as colors, icons, fonts, and the like to visually distinguish between the event sets.

Illustratively, interface 500c may be utilized to compare timelines created by different analysts, to assess whether events from a first and second timeline should be combined into a single timeline, to compare two potential timelines of events (e.g., compare two different theories of a case or present counterarguments to a theory), and/or the like. In some embodiments, interface 500c may include controls or other user interface elements to facilitate merging two or more timelines, and may further assign attributes to timeline events based on, for example, the original source or creator of the timeline. For example, interface 500c may generate a merged timeline that highlights each event according to whether the event was originally included in the first timeline, the second timeline, or both timelines.

Figure 5D:
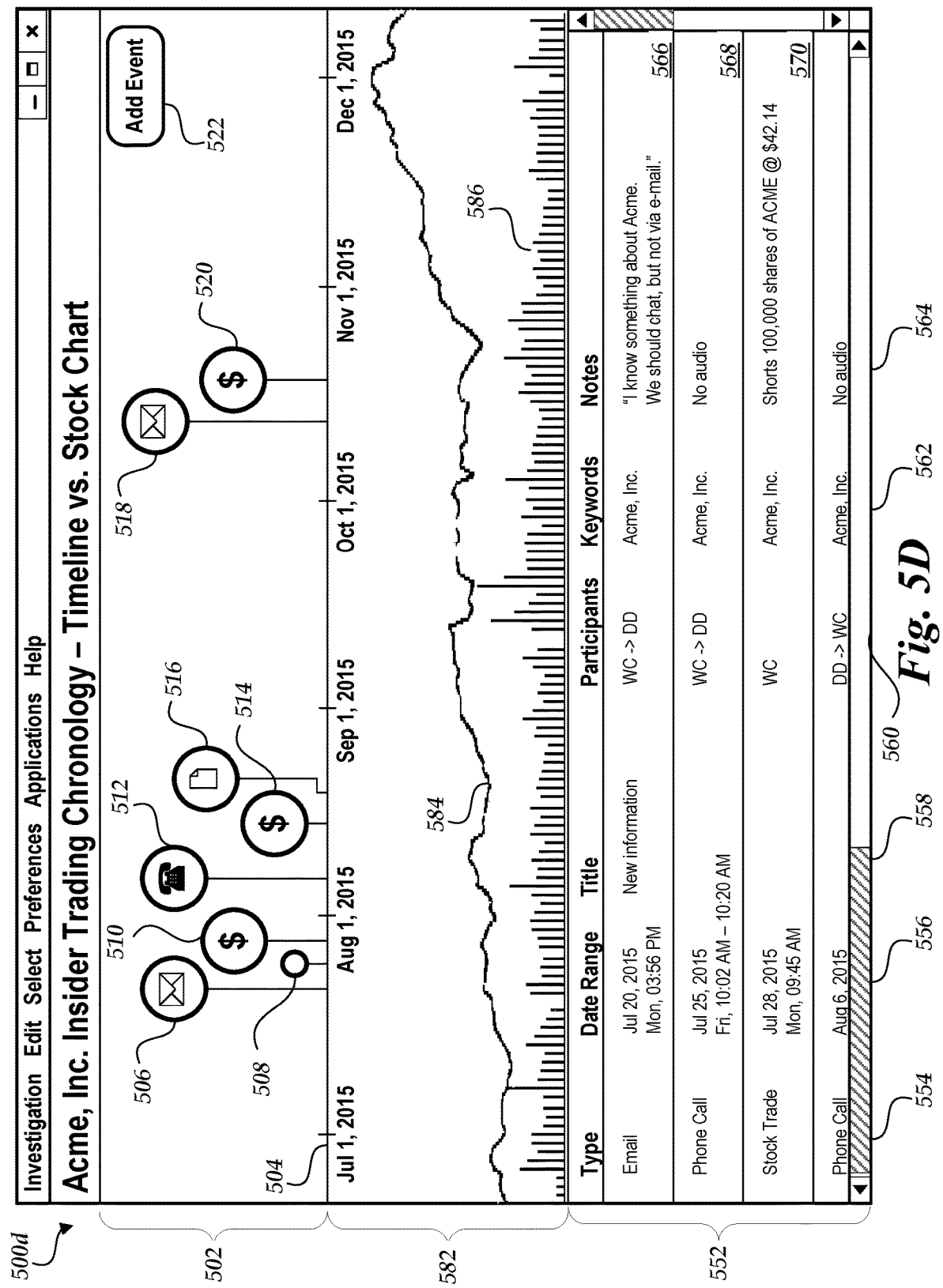

With reference now to FIG. 5D, an example interface 500d for displaying historical data will be described. Interface 500d may be displayed, for example, as a modification or update to interface 500a. Accordingly, only the elements of interface 500d that differ relative to interface 500a will be described.

Interface 500d includes an historical interface 592 for displaying and interacting with historical data—that is, data associated with times displayed on the timeline 504. In the illustrated embodiment, the historical interface 592 displays historical stock prices 594 and trading volumes 596 for Acme, Inc. stock, which is the stock that was traded in events 510, 514, and 520. As other, non-limiting examples, the historical interface 592 may display data such as health statistics, account balances, sales volumes, or other data that varies over time and in relation to the set of relevant events.

In some embodiments, selection of an event in the timeline interface 502 or list interface 552 may cause an update to the historical interface 592. For example, selecting event icon 516 may highlight trading volumes or stock prices on the associated date. Selection of a particular date in the historical interface 592 may further cause display of an event selection interface, as described above with reference to FIG. 5B, that displays events within an interval of the selected date and time, and that provides controls for viewing these events or for adding these events to the set of relevant events.

Figure 5E:
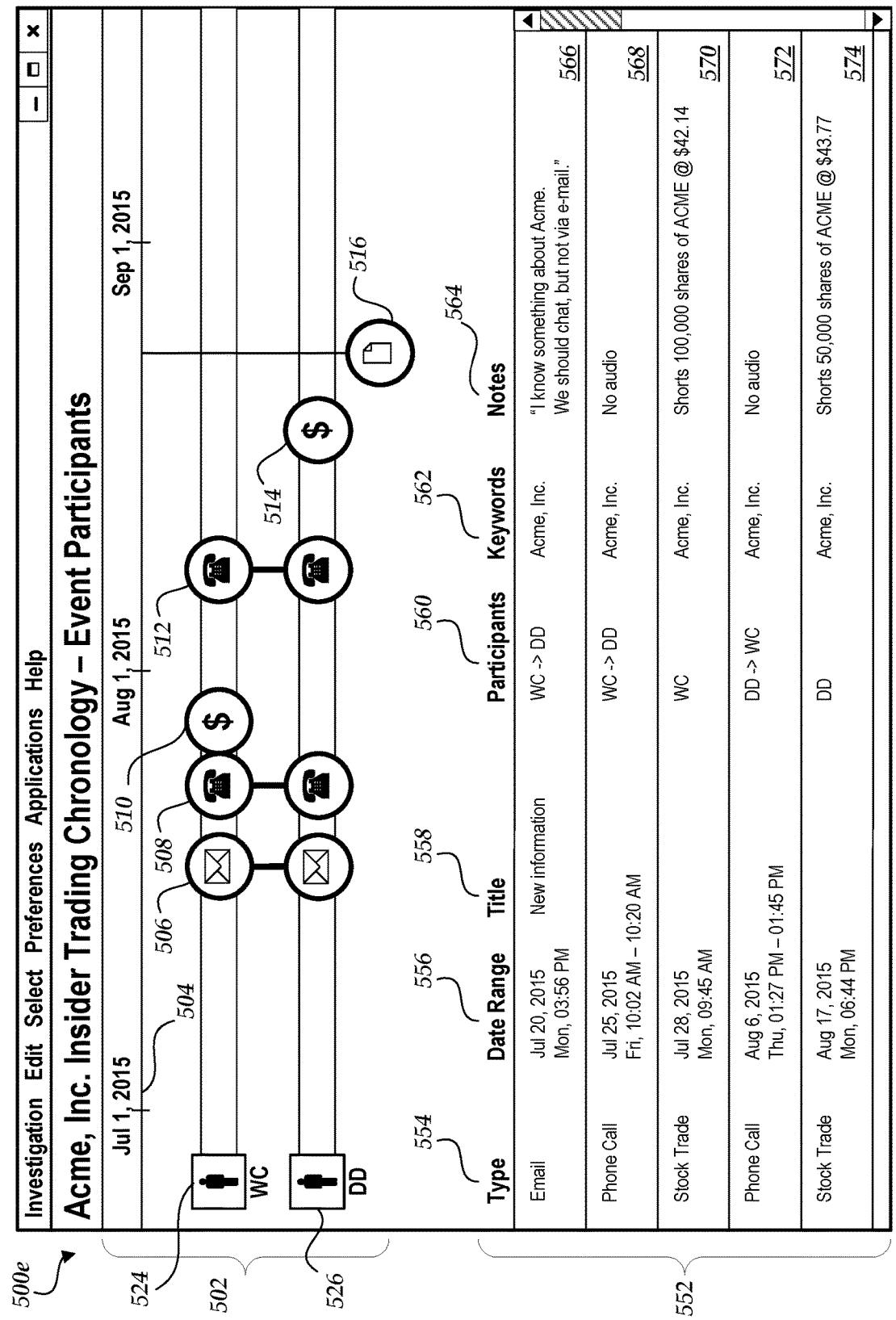

FIG. 5E depicts an example interface 500e for displaying event participant timelines. Interface 500e may be displayed, for example, as a variation or alternative to interface 500a. Accordingly, only the elements of interface 500e that differ relative to interface 500a will be described.

Interface 500e includes participant timelines 524 and 526 within its timeline interface 502. Participant timeline 524 includes event icons 506, 508, 510, 512, all of which correspond to events that include "WC" as a participant.

Participant timeline 526 includes event icons 506, 508, 512, and 514, all of which correspond to events that include "DD" as a participant. Events having multiple participants, such as the telephone call corresponding to event icon 508, display a connection between the participants. The timeline 504 further includes event 516, which does not have any participants and accordingly is not included on either of the participant timelines 524 and 526.

Interface 500e may display more or fewer participant timelines within the scope of the present disclosure. For example, interface 500e may display three participant timelines and include events with three participants, or may display a single participant timeline in response to, e.g., input selecting the participant. In some embodiments, participants may be added or removed from the timeline interface 502 based on received inputs. As a non-limiting example, the interface 500e may display a single participant timeline for X, which includes an email exchange between X, Y and Z. Selecting the email event may thus cause generation and/or display of participant timelines for Y and Z.

FIG. 5F depicts an example interface 500f that combines elements of the timeline interface 502 and the list interface 552. The timeline 504 of FIG. 5F is displayed vertically as a calendar rather than horizontally as a line, and entries in the list interface 552 are spaced according to their positions in the calendar. In some embodiments, the timeline interface of FIG. 502 may be interactive, such that "zooming in" on the calendar may cause display of a shorter time interval and allow, e.g., viewing of timelines at the daily or hourly level.

Chronology user interfaces 500a-f are non-limiting examples, and the present disclosure encompasses further variations that are not illustrated in the drawings. As an example, a timeline interface 502 may display a different set of events than the associated list interface 552, or one interface may display a subset of the events displayed in the other interface. As a further example, events corresponding to a date or time range may be displayed as blocks or ranges within the timeline interface. Further, various features of the various user interfaces 500a-f described above may be combined in various ways.

In various embodiments, one or more of the user interfaces 500a-f described above may include various additional features.

In some embodiments, events (as displayed in the example user interfaces described above) may be stored in an optimized database and/or table, which may be separate from the database 209, for example. For example, when a data object is added to a timeline/list of a chronology user interface, certain properties/attributes associated with that data object may be extracted and stored in the optimized database in association with the event that is added to the user interface. Advantageously, some properties associated with a data object may not be relevant to the display of the event in a chronology user interface, and thus may not be stored in the optimized database. Thus, when the chronology user interface is generated based on events stored in the optimized database, fewer properties of the events may need to be read (speeding up accessing and processing time), and the stored information may be less than with the full data objects were stored.

In some implementations, such events stored in an optimized database may include links back to the respective data objects. Thus, via a chronology user interface (such as one or more of the user interfaces 500a-f), the user may select to view the data object associated with the event, and the system may link to the data object by automatically executing an application associated with the data object (e.g., generate a user interface similar to the user interface of FIG. 4). In various implementations, the user may manually link an event to a data object, the user may manually enter an event (including its associated properties/attributes), the user may manually cause an event to be added via selection of a data object, the system many automatically add events associated with data objects, and/or the like.

In some implementations, multiple users may collaborate with one another via chronology user interfaces. For example, two users, via two different computing devices, may view a same chronology, and/or events associated with a same chronology. Either user may, for example, reorder or edit events and/or properties associated with events (e.g., a user may add comments or keywords to, or otherwise annotate, an event). In response the system may automatically propagate those changes to the user interface of the other user, such that the events viewed by either collaborating user may be updated automatically.

In some implementations, access to a chronology may be controlled. For example, a password may be required to access the chronology, or an access control list (ACL) may be used. An ACL is a set of one or more permissions that govern use (e.g., read access, write access, etc.) of the associated chronologies, or that govern use of individual rows or events within a chronology. For example, a permission may specify a set of one or more trustees (e.g., a user) and one or more use rights (e.g., read access, write access, etc.) of those trustees with respect to the associated chronology. As another example, a permission may specify a minimum security classification level (e.g., unclassified, secret, top secret, or a particular job title or position) such that only users that possess the minimum security classification level can use (e.g., read, write, etc.) rows or events in a chronology that involve a particular subject or that originate from a particular source.

In some implementations, the user interfaces may include one or more search user interface elements or search user interfaces by which the user may search or filter events (e.g., using keywords). For example, the user may specify certain terms, and any event that is associated with that term (e.g., includes the term in an annotation or other property) may be displayed to the user in a results list, or the user interface may be updated to only display events (in the list and/or timeline) that are associated with that term.

In some implementations, events displayed in a user interface may be linked to an original source (e.g., a source of the information associated with the event, a data object associated with the event, etc.) such that any changes to that original source may be automatically updated and reflected in the user interface. For example, new information may become available indicating a change to a time or date associated with an event. Accordingly, the system may determine that this change has been made, and automatically update the user interface to indicate the change. For example, the event may move on the timeline, or the list may be reordered. The user may be notified of the change via an indication in the user interface, and/or an alert may be sent to the user, as described below.

Additional examples of user interfaces and user interface features, and system for generating user interfaces, as described herein, may be found in U.S. patent application Ser. No. 14/841,338, filed Aug. 31, 2015, and titled "SYSTEM FOR PROVIDING DYNAMIC LINKED PANELS IN USER INTERFACE," the entire disclosure of which is hereby made part of this specification as if set forth fully herein and incorporated by reference for all purposes, for all that it contains.

Further examples of user interfaces and user interface features, and systems for generating user interfaces with timelines and linking data objects may be found in U.S. patent application Ser. No. 14/670,089, filed Mar. 26, 2015, and titled "TEMPORAL REPRESENTATION OF STRUCTURED INFORMATION IN AN OBJECT MODEL," the entire disclosure of which is hereby made part of this specification as if set forth fully herein and incorporated by reference for all purposes, for all that it contains.

Additional examples of Access Control Lists and ACL features, and systems for generating ACLs as described herein, may be found in U.S. Pat. No. 8,527,461 entitled "CROSS-ACL MULTI-MASTER REPLICATION" filed Nov. 27, 2012, U.S. Pat. No. 8,688,749 entitled "CROSS-ONTOLOGY MULTI-MASTER REPLICATION" filed Mar. 31, 2011, U.S. Pat. No. 9,081,975 entitled "SHARING INFORMATION BETWEEN NEXUSES THAT USE DIFFERENT CLASSIFICATION SCHEMES FOR INFORMATION ACCESS CONTROL" filed Oct. 22, 2012, and U.S. Pat. No. 8,838,538 entitled "TECHNIQUES FOR REPLICATING CHANGES TO ACCESS CONTROL LISTS ON INVESTIGATIVE ANALYSIS DATA" filed Jul. 31, 2013, the entire disclosure of each of which is hereby made part of this specification as if set forth fully herein and incorporated by reference for all purposes, for all that it contains.

Additional examples of user interfaces and user interface features, similar to those described herein, may be found in Appendix A of U.S. Provisional Application No. 62/272,526, the entire disclosure of which is hereby made part of this specification as if set forth fully herein and incorporated by reference for all purposes, for all that it contains.

In reference to Appendix A of U.S. Provisional Application No. 62/272,526, pages 2-12 illustrate examples of alternative designs of user interfaces similar to those described above. Pages 13-17 illustrate examples of alternative user interface designs and/or exported documents (e.g., exports of the chronology user interfaces) similar to the user interfaces described above. Pages 18-110 illustrate additional examples of alternative designs and functionality of user interfaces similar to those described above.

Example Methods/Routines

Figure 6:
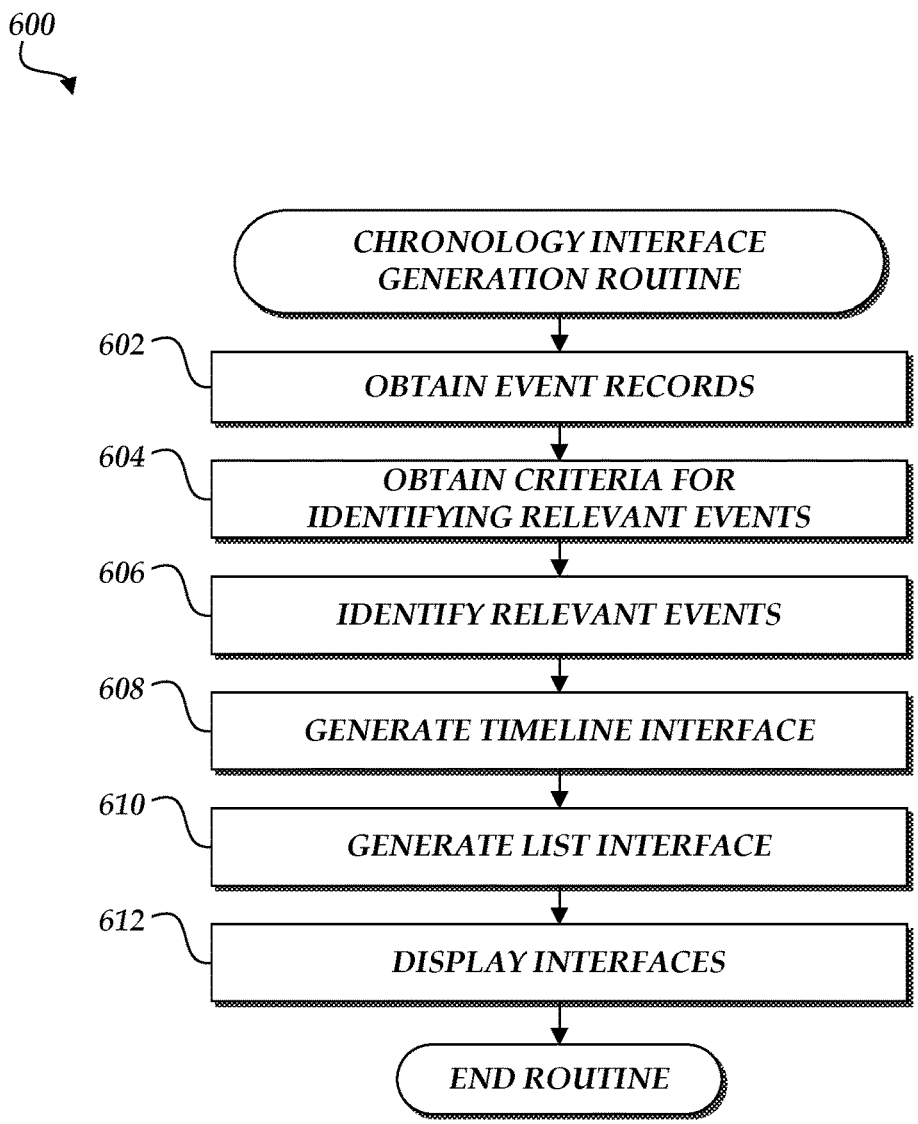
FIG. 6 is a flow diagram depicting an example routine for generating a chronology user interface in accordance with aspects of the present disclosure.

With reference now to FIG. 6, an example routine 600 for generation of a chronological interface will be described. At block 602, a set of events may be obtained. The set of events may illustratively include thousands or millions of events, only a portion of which may be relevant to an investigation or analysis. For example, the set of events may include all stock trades carried out within a particular timeframe, a log of all email messages sent or received, and so forth. Events may illustratively be obtained from a data store, such as the database 209 described above with reference to FIG. 2, and may correspond to data objects of a particular type (e.g., an "event" type) defined in an ontology 205. In some embodiments, a link may be maintained between the obtained events and their representations in the database 209. In other embodiments, one or more events may be obtained based on input data, and may further be linked to corresponding data objects in the database 209.

At block 604, criteria may be obtained for identifying a set of relevant events within the larger set of events. For example, the criteria may specify financial transactions involving certain participants, emails that include certain keywords, events on or about a particular date, or various other criteria. In some embodiments, the criteria may be inputs indicating selection of events. For example, the criteria may be a series of drag-and-drop inputs or other inputs indicating that an event should be added to the timeline. At block 606, a set of relevant events may be identified based on the criteria obtained at block 604.

At block 608, a timeline interface, such as the timeline interface 502 as described above, may be generated for display. Illustratively, the set of relevant events obtained at block 606 may be organized into a timeline according to their date and time attributes, and may be displayed as icons or symbols on the timeline as described above. At block 610 a list interface, such as the list interface 552, may be generated for display. One skilled in the art will appreciate that blocks 608 and 610 may be carried out independently of each other, and that the blocks may be carried out in parallel or in any order. At block 612, the timeline and list interfaces may be displayed.

In some embodiments, blocks 604-612 may be carried out repeatedly to generate updated timeline interfaces and list interfaces, or to generate additional timeline interfaces and list interfaces for display, as described above with reference to FIGS. 5B and 5C.

Figure 7:
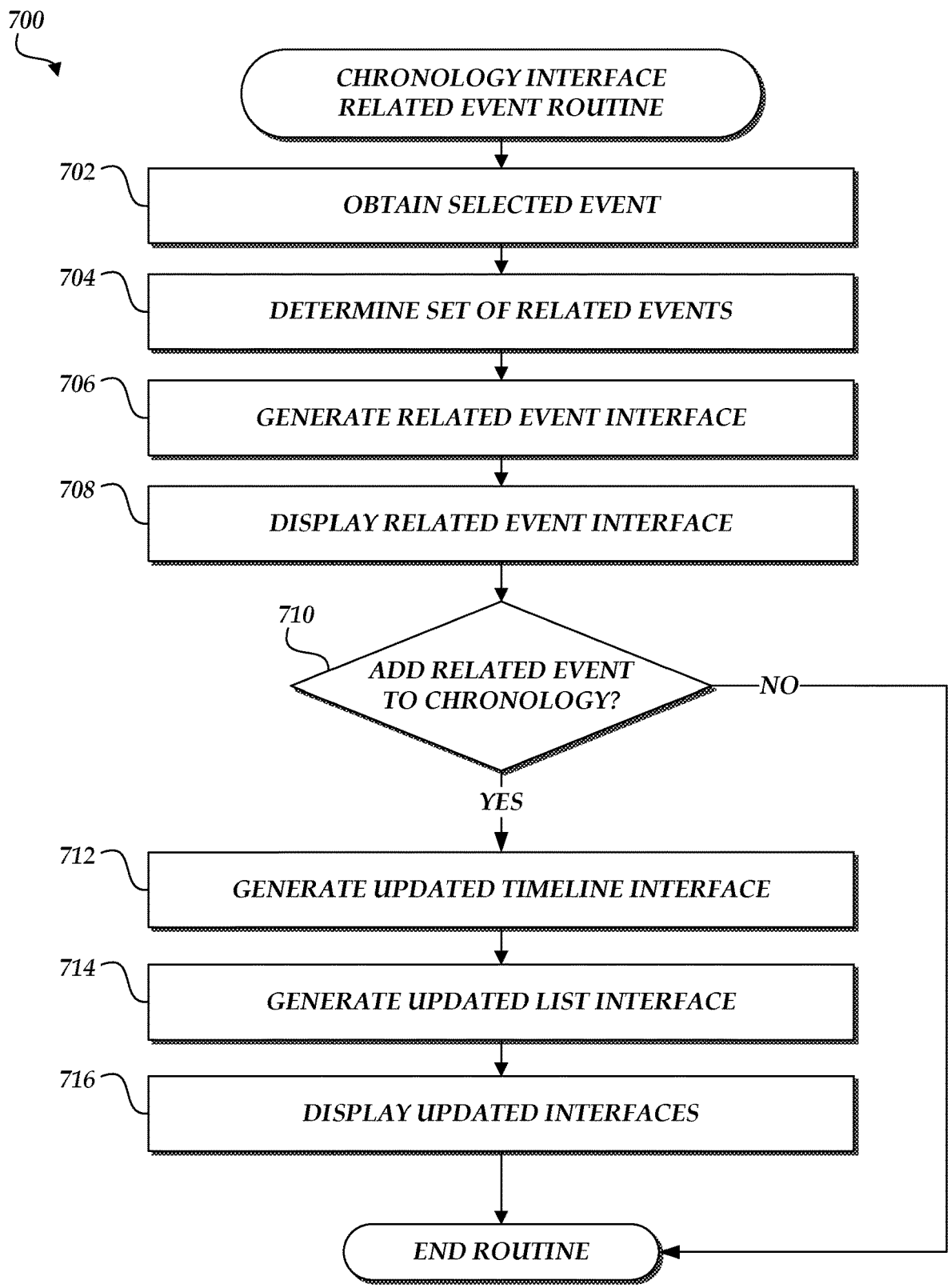
FIG. 7 is a flow diagram depicting an example routing for identifying events related to the chronology and presenting an updated user interface in accordance with aspects of the present disclosure.

With reference now to FIG. 7, an example routine 700 for processing related events will be described. At block 702, an event may be obtained. For example, an event may be obtained based on input indicating a selection in the timeline interface 502 or the list interface 552.

At block 704, a set of related events may be determined. Illustratively, the set of related events may be determined based on further input, such as a request to display other telephone calls made within a specified timeframe of a selected telephone call event. In some embodiments, the set of related events may be determined automatically. For example, the set of relevant events may be analyzed to determine the relevance of a particular selected event, based on attributes or other criteria that the relevant events have in common. Events may be identified as potentially related if they are tagged with a certain keyword (such as "Acme, Inc." in the examples above), involve certain participants, or occur relatively closely in time to events in the set of relevant events. The analysis may further consider key events in the timeline as indications of greater relevance. For example, stock trades that occur just before an earnings report may be identified as potentially related to the set of relevant events. In some embodiments, machine learning may be used to refine the automatic identification of related events based on previous manual selections of related events. For example, weighting factors may be applied to bias identification of related events in favor of events similar to those selected for inclusion in the timeline and list interfaces. In some embodiments, the identified events may be assigned a score or grade indicating a predicted likelihood of being related to the set of relevant events.

At block 706, a related event interface may be generated for display, as described above with reference to FIG. 5B. At block 708, the related event interface may be displayed.

Thereafter, at decision block 710, a determination may be made that one or more of the related events should be added to the set of relevant events. Illustratively, the determination may be made based on input selecting a related event for addition to the timeline, on scores or grades assigned to the related events, or based on other criteria. If the determination is that no related events should be added to the set, the routine 700 ends. Otherwise, the routine 700 branches to block 712, where an updated timeline interface may be generated that includes the newly added relevant event. At block 714, which may precede, follow, or be carried out in parallel with block 712, a list interface may be generated that includes the new relevant event. At block 716, the updated interfaces may be displayed, and thereafter the routine ends. In some embodiments, blocks 704-716 may be carried out iteratively to update the list of related events after a modification to the set of relevant events.

In some embodiments, an alert and/or notification may be automatically generated when data objects are updated, in response to changes to one or more events, in response to various changes in user interfaces, and/or the like, and the alert may be transmitted to the device operated by the entity associated with the alert and/or notification. The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., a chronology application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page generated by the chronology system so that the entity can log in to the chronology system and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet. Alerts may include, for example, notifications to a user regarding a change to an event (e.g., by another user that is collaborating with the user), notifications to a user regarding new data objects that represent events related to events in a chronology, and/or the like.

Additional Embodiments

Embodiments of the present disclosure have been described herein with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as example only, with a true scope and spirit of the present disclosure being indicated by the following claims. It is also intended that the sequence of steps shown in figures are only for illustrative purposes and are not intended to be limited to any particular sequence of steps. As such, it is appreciated that these steps can be performed in a different order while implementing the example methods or processes disclosed herein. Further, the inventions illustratively disclosed herein suitably may be practiced in the absence of any element or aspect which is not specifically disclosed herein, such as without.

Depending on the embodiment, certain acts, events, or functions of any of the methods described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules and method elements described in connection with the embodiments disclosed herein can be implemented as electronic hardware, computer software or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The elements of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM or any other form of computer-readable storage medium known in the art. A storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g." and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," "involving" and the like are synonymous and are used inclusively, in an open-ended fashion, and do not exclude additional elements, features, acts, operations and so forth. For example, a general purpose computer comprising one or more processors should not be interpreted as excluding other computer components, and may possibly include such components as memory, input/output devices, and/or network interfaces, among others. Also, the term "or" is used in its inclusive sense (and not in its exclusive sense) so that when used, for example, to connect a list of elements, the term "or" means one, some or all of the elements in the list.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A system comprising:
    a data store configured to store computer-executable instructions; and
    a processor in communication with the data store, wherein the computer-executable instructions, when executed by the processor, configure the processor to perform operations including:
        determining, based at least in part on a criterion associated with an attribute of at least one event of a plurality of events, a set of key events within the plurality of events;
        obtaining historical data corresponding to a time interval associated with one of more key events of the set of key events;
        generating for display a user interface based at least in part on the set of key events, the time interval, and the historical data, the user interface comprising:
            a first timeline interface for display of a key event timeline, wherein positions of individual key events within the first timeline interface are determined based at least in part on respective key event timestamps, wherein the timeline interface displays key event icons offset from a horizontal timeline at positions corresponding to the key event timestamps, and wherein the key event icons comprise indications of event type;
            a second timeline interface for display of the historical data, wherein the second timeline interface displays portions of the historical data at positions corresponding to the horizontal timeline; and
            a list interface for display of at least the set of key events, wherein each row in the list interface corresponds to a respective key event of the set of key events, and wherein information corresponding to the key event is displayed in columns;
        cause display of the user interface; and
        display, in response to a user selection of a key event icon, a highlighted row in the list interface corresponding to the key event, a highlighted portion of the historical data corresponding to at least one attribute of the key event, and an event selection interface, wherein the event selection interface is displayed within the highlighted row and includes the at least one attribute, wherein the event selection interface displays one or more events from the plurality of events that correspond to the highlighted portion of the historical data, and wherein the event selection interface enables selecting an event to be added to the set of key events.

2. The system of claim 1, wherein the historical data comprises one or more of trading volumes, stock prices, account balances, sales volumes, or health statistics.

3. The system of claim 1, wherein at least one key event of the set of key events is associated with a change in the historical data.

4. The system of claim 1, wherein the highlighted portion of the historical data corresponds to a date and time interval that includes the key event.

5. The system of claim 1, wherein the operations further include displaying additional information regarding the highlighted portion of the historical data.

6. A computer-implemented method comprising:
    determining, based at least in part on a criterion, a set of key events within a plurality of events;
    obtaining historical data corresponding to a time interval associated with at least a portion of the plurality of events;
    generating for display a user interface based at least in part on the set of key events, the time interval, and the historical data, the user interface comprising:
        a first timeline interface for display of a key event timeline, the timeline interface comprising:
            a timeline displayed as a horizontal line;
            one or more key events from the set of key events, each of the one or more key events displayed as a respective key event icon offset from the horizontal line and connected to the timeline at a position determined based at least in part on a timestamp associated with the key event, wherein the key event icon indicates a type of the key event;
a second timeline interface for display of the historical data, wherein the second timeline interface displays portions of the historical data at positions corresponding to the timeline; and
a list interface for display of at least the set of key events, the list interface comprising:
one or more rows, each of the one or more rows corresponding to a respective key event of the set of key events; and
one or more columns, each of the one or more columns corresponding to a respective attribute of key events;
causing display of the user interface; and
in response to user selection of a key event icon associated with a key event:
causing a portion of the historical data associated with the key event and a row corresponding to the key event to be highlighted; and
causing an event selection interface to be displayed, wherein the event selection interface is displayed within the highlighted row and includes at least one attribute of the key event, wherein the event selection interface displays one or more events from the plurality of events that correspond to the highlighted portion of the historical data, and wherein the event selection interface enables selecting an event to be added to the set of key events.

7. The computer-implemented method of claim 6, wherein the portion of the historical data associated with the key event comprises a portion of the historical data within an interval of the timestamp of the key event.

8. The computer-implemented method of claim 6 further comprising:
in response to user selection of a time interval in the second timeline interface, causing at least one of a key event corresponding to the time interval or a row corresponding to the time interval to be highlighted.

9. The computer-implemented method of claim 8, wherein a highlighted row that corresponds to the time interval does not correspond to a key event.

10. The computer-implemented method of claim 9 further comprising causing display of one or more user interface controls that enable adding the highlighted row to the set of key events.

11. The computer-implemented method of claim 6, wherein the highlighted portion of the historical data corresponds to a time interval between two key events.

12. A non-transitory computer-readable medium including computer-executable instructions that, when executed by a processor, configure the processor to perform operations including:
determining, based at least in part on a first criterion, a first set of key events within a plurality of events;
determining, based at least in part on a second criterion, a second set of key events within the plurality of events, wherein at least one key event is included in both the first set of key events and the second set of key events;
generating for display a user interface based at least in part on the first set of key events and the second set of key events, the user interface comprising:
a first timeline interface for display of a first key event timeline, the first timeline interface comprising a first one or more key events from the first set of key events, each of the first one or more key events displayed as a respective key event icon on a first horizontal timeline at a position determined based at least in part on a timestamp associated with the key event;
a second timeline interface for display of a second key event timeline, the second timeline interface comprising a second one or more key events from the second set of key events, each of the second one or more key events displayed as a respective key event on a second horizontal timeline at a position determined based at least in part on a timestamp associated with the key event; and
a list interface comprising:
one or more rows, each of the one or more rows corresponding to a respective event of the plurality of events; and
one or more columns, each of the one or more columns corresponding to a respective event attribute; and
in response to a user selection, generating for display an updated user interface comprising:
a highlighted key event icon in at least one of the first timeline interface or the second timeline interface;
a highlighted row in the list interface corresponding to the highlighted key event icon; and
an event selection interface, wherein the event selection interface is displayed within the highlighted row and includes at least one event attribute, wherein the event selection interface displays one or more events from the plurality of events that correspond to the highlighted portion of the historical data, and wherein the event selection interface enables selecting an event to be added to the set of key events.

13. The non-transitory computer-readable medium of claim 12, wherein the user interface further includes at least one indication that a key event icon on the first horizontal timeline and a key event icon on the second horizontal timeline represent the same key event.

14. The non-transitory computer-readable medium of claim 12, wherein the first timeline interface corresponds to a first participant in the first one or more key events and the second timeline interface corresponds to a second participant in the second one or more key events.

15. The non-transitory computer-readable medium of claim 14, wherein the user interface further comprises a third timeline interface corresponding to a third participant in at least one key event.

16. The non-transitory computer-readable medium of claim 15, wherein the third timeline interface is displayed in response to user selection of the at least one key event.

17. The non-transitory computer-readable medium of claim 14, wherein the user interface further comprises an event icon corresponding to an event that does not include the first participant or the second participant, and wherein the event icon is displayed relative to the first timeline interface and the second timeline interface at a position determined based at least in part on a timestamp associated with the event that does not include the first participant or the second participant.

18. The non-transitory computer-readable medium of claim 14, wherein the first timeline interface includes one or more controls enabling the first participant to be added to key events or removed from key events.

19. The non-transitory computer-readable medium of claim 14, wherein the first timeline interface and the second timeline interface are displayed in response to user selection of a key event that includes the first participant and the second participant.

20. The non-transitory computer-readable medium of claim 12 further comprising causing, in response to user input, at least one of the first timeline interface or the second timeline interface to no longer be displayed.

\* \* \* \* \*